(12) United States Patent
Shigematsu et al.

(10) Patent No.: US 9,193,826 B2
(45) Date of Patent: Nov. 24, 2015

(54) THERMOPLASTIC RESIN COMPRISING A FLUORENE DERIVATIVE

(71) Applicant: TEIJIN LIMITED, Osaka (JP)

(72) Inventors: Teruyuki Shigematsu, Tokyo (JP); Manabu Matsui, Tokyo (JP); Kazushi Tando, Tokyo (JP); Kazunori Nunome, Tokyo (JP)

(73) Assignee: TEIJIN LIMITED, Osaka (JP)

( * ) Notice: Subject to any disclaimer, the term of this patent is extended or adjusted under 35 U.S.C. 154(b) by 0 days.

(21) Appl. No.: 14/625,740

(22) Filed: Feb. 19, 2015

(65) Prior Publication Data

US 2015/0158975 A1  Jun. 11, 2015

Related U.S. Application Data

(62) Division of application No. 14/006,159, filed as application No. PCT/JP2012/058781 on Mar. 27, 2012.

(30) Foreign Application Priority Data

Mar. 28, 2011 (JP) ................................ 2011-070364

(51) Int. Cl.
| | |
|---|---|
| C08G 14/02 | (2006.01) |
| C08G 64/16 | (2006.01) |
| C08G 63/19 | (2006.01) |
| C08G 63/64 | (2006.01) |
| C08G 64/06 | (2006.01) |
| C08G 63/133 | (2006.01) |
| C08G 63/66 | (2006.01) |

(52) U.S. Cl.
CPC .......... *C08G 64/1608* (2013.01); *C08G 63/133* (2013.01); *C08G 63/19* (2013.01); *C08G 63/64* (2013.01); *C08G 63/66* (2013.01); *C08G 64/06* (2013.01)

(58) Field of Classification Search
CPC .............. C08G 61/04; C08G 18/7621; C08G 18/7671; C08G 18/771; C08G 18/3215; C08G 18/10; C08G 18/6674; C08G 8/02; C07C 49/84; C07C 49/83
USPC .................... 528/139, 125; 568/331; 435/148
See application file for complete search history.

(56) References Cited

U.S. PATENT DOCUMENTS

| | | |
|---|---|---|
| 5,530,086 A | 6/1996 | Fuji et al. |
| 2005/0250930 A1 | 11/2005 | Ikeda et al. |
| 2007/0106053 A1 | 5/2007 | Fuji et al. |
| 2011/0178265 A1 | 7/2011 | Tanaka et al. |

FOREIGN PATENT DOCUMENTS

| | | | |
|---|---|---|---|
| CN | 1711303 | 12/2005 | |
| JP | 57-108128 | 7/1982 | |
| JP | 9-255609 | 9/1997 | |
| JP | 09-255609 | * 9/1997 | .............. C07C 43/23 |
| JP | 2843215 | 10/1998 | |
| JP | 2005-089509 | 4/2005 | |
| JP | 2008-511730 | 4/2008 | |
| JP | 2008-111047 | 5/2008 | |
| JP | 2009-108280 | 5/2009 | |
| JP | 2009-185299 | 8/2009 | |
| JP | 2011-042807 | 3/2011 | |
| WO | 2004/044033 | 5/2004 | |
| WO | 2006-028746 | 3/2006 | |
| WO | 2010/035591 | 4/2010 | |
| WO | 2010/119727 | 10/2010 | |
| WO | 2011/010741 | 1/2011 | |

OTHER PUBLICATIONS

English translation of International Preliminary Report on Patentability and Written Opinion dated Oct. 2, 2013.
Y. M. Sun et al., "Studies on the Formation of Novel Copolyesters, Containing Naphthalene and Aralkyloxy Structures", Journal of Applied Polymer Science, vol. 58, No. 7, pp. 1189-1197, 1995.
Extended European Search Report issued Aug. 12, 2014 in corresponding European Application No. 12764659.4.
Chinese Office Action issued Aug. 8, 2014 in corresponding Chinese Application No. 201280015542.5.

\* cited by examiner

*Primary Examiner* — Shane Fang
(74) *Attorney, Agent, or Firm* — Wenderoth, Lind & Ponack, L.L.P.

(57) ABSTRACT

A thermoplastic resin containing a fluorene derivative. The thermoplastic resin contains 30 mole % or more of a recurring unit derived from 9,9-bis(4-(2-hydroxyethoxy)phenyl)fluorene and has a content of phenyl vinyl ether represented by the following formula (1) of 100 ppm or less

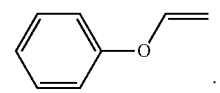

(1)

2 Claims, No Drawings

THERMOPLASTIC RESIN COMPRISING A FLUORENE DERIVATIVE

TECHNICAL FIELD

The present invention relates to a thermoplastic resin which comprises a fluorene derivative and is rarely colored during melt polymerization.

BACKGROUND ART

In recent years, resins produced from bisphenols, for example, epoxy resin, polyester resin, polycarbonate resin and polyester carbonate resin are widely used as materials having heat resistance, transparency, impact resistance and a high refractive index. Especially resins comprising a fluorene derivative such as 9,9-bis(4-(2-hydroxyethoxy)phenyl)fluorene are promising materials having high transparency and a high refractive index and are expected to be used as optical materials for auto head lamp lenses, CD's, CD-ROM's, pick-up lenses, Fresnel lenses, fθ lenses for laser printers, camera lenses and projection lenses for rear projection TVs.

Out of these, resins comprising an aromatic dicarboxylic acid and a fluorene derivative and resins comprising an aromatic diol and a fluorene derivative are proposed as materials for optical lenses having a high refractive index and little birefringence (Patent Documents 1 and 2). However, since these resins are colored during melt polymerization, products which are excellent in hue may not be obtained.

To solve this problem, there are reports concerning the hue of a resin comprising a fluorene derivative (Patent Documents 3 and 4). In these reports, the coloration of the resin can be suppressed by reducing the content of the residual sulfur at the time of producing a fluorene derivative and the contents of sulfur and diethylene glycol in the resin.

However, since there is a case where the resin is colored even in the above method, there is still room for the improvement of the resin. Therefore, these problems must be solved in order to widely use the resin as an optical material.

(Patent Document 1) U.S. Pat. No. 2,843,215

(Patent Document 2) JP-A 10-101786

(Patent Document 3) JP-A 2008-111047

(Patent Document 4) JP-A 2009-185299

DISCLOSURE OF THE INVENTION

It is an object of the present invention to provide a thermoplastic resin which comprises a fluorene derivative and is excellent in hue.

The inventors of the present invention conducted intensive studies to attain the above object and found that when a thermoplastic resin is produced by using 9,9-bis(4-(2-hydroxyethoxy)phenyl)fluorene (may be referred to as BPEF hereinafter) having a controlled content of a specific by-product, a thermoplastic resin which is excellent in hue is obtained. The present invention was accomplished based on this finding.

That is, the present invention is a thermoplastic resin comprising 30 mole % or more of a recurring unit derived from 9,9-bis(4-(2-hydroxyethoxy)phenyl)fluorene, wherein the content of phenyl vinyl ether represented by the following formula (1) is 100 ppm or less.

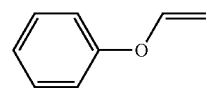

(1)

The present invention is also a process for producing a thermoplastic resin by reacting a dihydroxy component containing 9,9-bis(4-(2-hydroxyethoxy)phenyl)fluorene with at least one component selected from the group consisting of a dicarboxylic acid component and a carbonic acid ester component, wherein the purity of 9,9-bis(4-(2-hydroxyethoxy)phenyl)fluorene is 99 wt % or more, and the content of phenoxyethanol is 1 to 500 ppm.

BEST MODE FOR CARRYING OUT THE INVENTION

The thermoplastic resin of the present invention comprises 30 mole % or more of a unit derived from BPEF and represented by the following formula. The content of the BPEF-derived unit is preferably 40 to 100 mole %, more preferably 60 to 100 mole %.

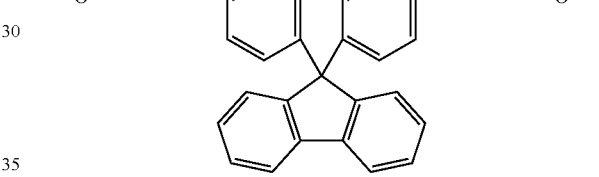

Examples of the thermoplastic resin include polycarbonate resin, polyester resin and polyester carbonate resin. The resin of the present invention is used in at least one selected from the group consisting of an optical film, optical disk, optical prism and optical lens.

<Impurities>

The content of phenyl vinyl ether represented by the formula (1) in the thermoplastic resin of the present invention is 100 ppm or less, preferably 50 ppm or less, more preferably 10 ppm or less based on the thermoplastic resin. Outside the above range, a resin having a good hue is not obtained.

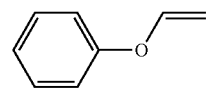

(1)

Further, the content of acetaldehyde represented by the following formula (2) in the thermoplastic resin of the present invention is preferably 200 ppm or less based on the thermoplastic resin. The content of acetaldehyde represented by the formula (2) in the resin is more preferably 100 ppm or less, much more preferably 10 ppm or less. When the content of the compound represented by the formula (2) is higher than 200 ppm, the compound reacts with a metal-based catalyst to deteriorate the hue and become a gas generated at the time of molding which is one of the causes of a molding failure, whereby a satisfactory molded product may not be obtained.

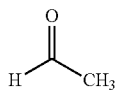

(2)

To adjust the contents of phenyl vinyl ether represented by the formula (1) and acetaldehyde represented by the formula (2) to the above ranges, the content of phenoxyethanol in BPEF as a raw material is preferably reduced. Phenoxyethanol which is used at the time of manufacture remains in BPEF. When the content of this phenoxyethanol is high, phenyl vinyl ether represented by the formula (1) and acetaldehyde represented by the formula (2) tend to be by-produced during the polymerization of the thermoplastic resin. The content of phenoxyethanol in the raw material BPEF is preferably 1 to 500 ppm, more preferably 1 to 450 ppm, much more preferably 1 to 400 ppm.

Further, the content of fluoren-9-one represented by the formula (3) in the thermoplastic resin of the present invention is preferably 200 ppm or less. When the content of fluoren-9-one represented by the formula (3) in the resin is 200 ppm or less, a resin having a good hue is obtained. The content of fluoren-9-one represented by the formula (3) in the resin is more preferably 100 ppm or less, much more preferably 50 ppm or less based on the thermoplastic resin. Outside the above range, the resin is colored and a molded product having a good hue may not be obtained.

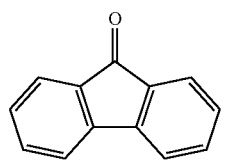

(3)

To adjust the content of fluoren-9-one represented by the formula (3) to the above range, it is preferred to reduce the content of fluoren-9-one represented by the formula (3) in BPEF as a raw material of the thermoplastic resin. Fluoren-9-one is used to produce BPEF and remains in BPEF. When the content of fluoren-9-one in BPEF is high, fluoren-9-one tends to remain in the thermoplastic resin as well after polymerization, thereby increasing the content of fluoren-9-one in the thermoplastic resin. The content of fluoren-9-one represented by the formula (3) in the raw material BPEF is preferably 1 to 500 ppm, more preferably 1 to 450 ppm, much more preferably 1 to 400 ppm.

Although the lower the contents of the substances represented by the formulas (1), (2) and (3) in the resin, the better the hue of the resin becomes, the reduction of the contents is limited by restrictions on production such as the polymerization temperature, the degree of vacuum and the polymerization time, and the lower limit of each of the above contents is preferably 1 ppm or more.

<Process for Producing Thermoplastic Resin>

The thermoplastic resin of the present invention can be produced by reacting a dihydroxy component containing 9,9-bis(4-(2-hydroxyethoxy)phenyl)fluorene with at least one component selected from the group consisting of a dicarboxylic acid component and a carbonic acid ester component.

The purity of 9,9-bis(4-(2-hydroxyethoxy)phenyl)fluorene is 99 wt % or more, and the content of phenoxyethanol is 1 to 500 ppm. The content of fluoren-9-one represented by the following formula (3) in 9,9-bis(4-(2-hydroxyethoxy)phenyl)fluorene is preferably 500 ppm or less.

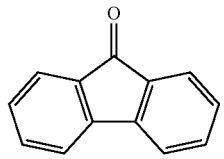

(3)

The purity of BPEF used in the present invention is preferably 99.5 wt % or more, more preferably 99.9 wt % or more. When the purity is outside the above range, a resin having a good hue is hardly obtained disadvantageously. The purity of BPEF can be measured by HPLC.

As an example of the method of purifying BPEF, repurification using an aliphatic alcohol and purification using activated carbon are effective. Although BPEF has low solubility in an aliphatic alcohol, impurities such as the compound represented by the formula (3) and phenoxyethanol have high solubility in an aliphatic alcohol. Stated more specifically, it is effective that a 85° C. 16 wt % toluene solution of BPEF should be re-precipitated in an aliphatic alcohol, and BPEF should be collected by filtration and dried to obtain a crude crystal. Examples of the aliphatic alcohol include methanol and ethanol having 1 to 2 carbon atoms. A 85° C. 16 wt % toluene solution containing this crude crystal is prepared, a solid is precipitated under agitation at room temperature or while the exterior of a vessel is cooled with cold water, and then the obtained crystal is separated by filtration, dried and collected. Thereafter, a 85° C. 16 wt % toluene solution containing the obtained crystal is prepared again, and recrystallization is carried out to collect a crystal. Further, the crystal is completely dissolved in acetone, and activated carbon (NoritSX Plus) is added to the resulting solution and stirred for 1 hour. Then, the activated carbon is filtered out, and acetone is distilled off to obtain a purified crystal. BPEF containing a desired total content of impurities can be obtained by the above purification method.

BPEF having the above contents or lower of impurities such as the compound of the above formula (3) and phenoxyethanol is used as a raw material for the thermoplastic resin of the present invention. When BPEF having high contents of phenoxyethanol and the component represented by the formula (3) is used, by-products tend to be produced during polymerization and may become substances which cause coloration disadvantageously. These by-products may also cause the generation of a gas during injection molding disadvantageously.

Preferably, the content of phenoxyethanol in BPEF is 500 ppm or less, and the content of fluoren-9-one is 500 ppm or less. When the content of phenoxyethanol is higher than the above value, phenyl vinyl ether represented by the formula (1) and acetaldehyde represented by the formula (2) which are by-products causing coloration during polymerization tend to be produced, whereby a resin having a good hue is hardly obtained disadvantageously. Similarly when the content of fluoren-9-one in BPEF is higher than the above value, it remains in the resin after polymerization, whereby a resin having a good hue is hardly obtained disadvantageously.

The purities of the dihydroxy component, the dicarboxylic acid component and the diester carbonate except for BPEF are each preferably 99 wt % or more, more preferably 99.5 wt % or more, much more preferably 99.9 wt % or more. When the purities are outside the above range, a resin having a good hue is hardly obtained disadvantageously. The purity can be measured by HPLC.

<Polycarbonate Resin>

An example of the thermoplastic resin of the present invention is a polycarbonate resin. The polycarbonate resin comprises a unit represented by the following formula (I).

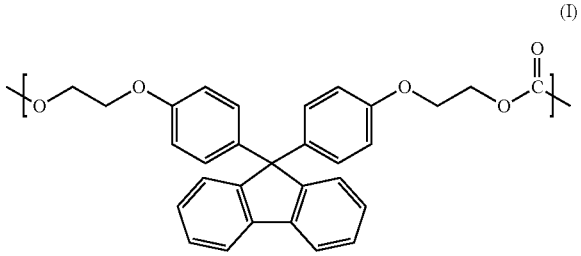

(I)

The polycarbonate resin is a resin obtained by reacting a dihydroxy component containing at least BPEF with a carbonic acid ester component in the presence of a basic compound catalyst.

The dihydroxy component may contain a comonomer except for BPEF. Examples of the comonomer include aromatic diols such as 1,1'-biphenyl-4,4'-diol, bis(4-hydroxyphenyl)methane, 1,1-bis(4-hydroxyphenyl)ethane, bis(4-hydroxyphenyl)ether, bis(4-hydroxyphenyl)sulfoxide, bis(4-hydroxyphenyl)sulfide, bis(4-hydroxyphenyl)sulfone, bis(4-hydroxyphenyl)ketone, 2,2-bis(4-hydroxyphenyl)propane, 2,2-bis(4-hydroxy-3-t-butylphenyl)propane, 2,2-bis(4-hydroxy-3-methylphenyl)propane, 1,1-bis(4-hydroxyphenyl)cyclopentane, 1,1-bis(4-hydroxyphenyl)cyclohexane, 2,2-bis(4-hydroxyphenyl)hexafluoropropane, bis(4-hydroxyphenyl)diphenylmethane, 1,1-bis(4-hydroxyphenyl)-1-phenylethane, 9,9-bis(4-hydroxyphenyl)fluorene, 9,9-bis(4-hydroxy-3-methylphenyl)fluorene, α,ω-bis[2-(p-hydroxyphenyl)ethyl]polydimethylsiloxane, α,ω-bis[3-(o-hydroxyphenyl)propyl]polydimethylsiloxane and 4,4'-[1,3-phenylenebis(1-methylethylidene)]bisphenol. Aliphatic diols such as ethylene glycol, and alicyclic diols such as tricyclo[5.2.1.0(2,6)]decanedimethanol, cyclohexane-1,4-dimethanol, decalin-2,6-dimethanol, norbornane dimethanol, pentacyclopentadecane dimethanol, cyclopentane-1,3-dimethanol, spiroglycol, isosorbide and isomannide are also included. They may be used alone or in combination of two or more. Out of these, 2,2-bis(4-hydroxyphenyl)propane (bisphenol A: BPA) is particularly preferred.

Examples of the diester carbonate include diphenyl carbonate, di-p-tolyl carbonate, phenyl-p-tolyl carbonate and dinaphtyl carbonate out of which diphenyl carbonate is particularly preferred. These aromatic diester carbonates may be used alone or in combination of two or more.

The polycarbonate resin has a content of the unit represented by the formula (I) of 30 mole % or more, preferably 40 to 100 mole %, more preferably 50 to 90 mole % based on the total of all dihydroxy components. By setting the content of the unit represented by the formula (I) to the above range, a polycarbonate resin having excellent optical properties such as refractive index is obtained.

As for strength, as the content of the unit represented by the formula (I) is higher, the elastic modulus becomes higher advantageously. However, since tensile elongation lowers when the content of the unit is too high, the content of the unit represented by the formula (I) is preferably 90 mole % or less.

The content of the unit represented by the formula (I) is more preferably 50 to 90 mole % based on the total of all the units.

The molecular weight of the polycarbonate resin is preferably 7,000 to 15,000, more preferably 8,000 to 14,000. The molecular weight is measured by a solution viscosity method.

As the process for producing the polycarbonate resin of the present invention, a process used to produce an ordinary polycarbonate resin is optionally employed. For example, a reaction between a diol and phosgene or a transesterification reaction between a diol and a bisaryl carbonate is preferably adopted.

The reaction between a diol and phosgene is carried out in the presence of an acid binder and a solvent in a non-aqueous system. Examples of the acid binder include pyridine, dimethylaminopyridine and tertiary amines. Examples of the solvent include halogenated hydrocarbons such as methylene chloride and chlorobenzene. An end-sealing agent such as phenol or p-tert-butylphenol is desirably used as a molecular weight control agent. The reaction temperature is generally 0 to 40° C., and the reaction time is several minutes to 5 hours.

In the transesterification reaction, the diol and the bisaryl carbonate are mixed together in the presence of an inert gas and reacted with each other in the presence of an alkali metal compound catalyst, an alkali earth metal compound or a mixed catalyst of these two under reduced pressure at generally 120 to 350° C., preferably 150 to 300° C. The degree of depressurization is changed stepwise and set to 133 Pa or less in the end to distill out the formed alcohol to the outside of the system. The reaction time is generally 1 to 4 hours. However, when the polymerization temperature is 350° C. or higher, phenyl vinyl ether represented by the formula (1) and acetaldehyde represented by the formula (2) tend to be by-produced and when the polymerization temperature is 120° C. or lower, the reaction does not proceed disadvantageously.

The polymerization catalyst comprises an alkali metal compound or an alkali earth metal compound as the main component and optionally a nitrogen-containing basic compound as an auxiliary component.

Examples of the alkali metal compound used as the catalyst include sodium hydroxide, potassium hydroxide, lithium hydroxide, sodium hydrogen carbonate, potassium hydrogen carbonate, lithium hydrogen carbonate, sodium carbonate, potassium carbonate, lithium carbonate, sodium acetate, potassium acetate, lithium acetate, sodium stearate, potassium stearate, lithium stearate, sodium salts, potassium salts and lithium salts of bisphenol A, sodium benzoate, potassium benzoate and lithium benzoate. Examples of the alkali earth metal compound include calcium hydroxide, barium hydroxide, magnesium hydroxide, strontium hydroxide, calcium hydrogen carbonate, barium hydrogen carbonate, magnesium hydrogen carbonate, strontium hydrogen carbonate, calcium carbonate, barium carbonate, magnesium carbonate, strontium carbonate, calcium acetate, barium acetate, magnesium acetate, strontium acetate, calcium stearate, barium stearate, magnesium stearate and strontium stearate.

Examples of the nitrogen-containing compound used as a co-catalyst include tetramethylammonium hydroxide, tetraethylammonium hydroxide, tetrabutylammonium hydroxide, trimethylbenzylammonium hydroxide, trimethylamine, triethylamine, dimethylbenzylamine, triphenylamine and dimethylaminopyridine.

These catalysts may be used alone or in combination of two or more, and the amount of the polymerization catalyst is $10^{-9}$ to $10^{-3}$ mole based on 1 mole of the total of all the diol components. When the amount of the catalyst exceeds the above range, phenyl vinyl ether represented by the formula (1) and acetaldehyde represented by the formula (2) tend to be by-produced, thereby deteriorating the hue disadvantageously. An antioxidant or a heat stabilizer may be added to improve the hue.

The catalyst may be removed or deactivated in order to retain the heat stability and hydrolytic stability of the polycarbonate resin of the present invention after the end of the polymerization reaction. As for the alkali metal compound or the alkali earth metal compound, a method of carrying out the deactivation of the catalyst by adding a known acid substance is advantageously carried out. Examples of the deactivation substance include esters such as butyl benzoate, aromatic sulfonic acids such as p-toluenesulfonic acid, aromatic sulfonic acid esters such as butyl p-toluenesulfonate and hexyl p-toluenesulfonate, phosphoric acids such as phosphorous acid, phosphoric acid and phosphonic acid, phosphorous acid esters such as triphenyl phosphite, monophenol phosphite, diphenyl phosphite, diethyl phosphite, di-n-propyl phosphite, di-n-butyl phosphite, di-n-hexyl phosphite, dioctyl phosphite and monooctyl phosphite, phosphoric acid esters such as triphenyl phosphate, diphenyl phosphate, monophenyl phosphate, dibutyl phosphate, dioctyl phosphate and monooctyl phosphate, phosphonic acids such as diphenylphosphonic acid, dioctylphosphonic acid and dibutylphosphonic acid, phosphonic acid esters such as diethyl phenylphosphonate, phosphines such as triphenylphosphine and bis(diphenylphosphino)ethane, boric acids such as boric acid and phenylboric acid, aromatic sulfonic acid salts such as dodecylbenzenesulfonic acid tetrabutylphosphonium salts, organic halides such as stearic acid chloride, benzoyl chloride and p-toluenesulfonic acid chloride, alkylsulfuric acids such as dimethylsulfuric acid, and organic halides such as benzyl chloride. The deactivator is used in an amount 0.01 to 50 times, preferably 0.3 to 20 times the molar amount of the catalyst. When the amount of the deactivator is smaller than 0.01 time the molar amount of the catalyst, the deactivation effect becomes unsatisfactory disadvantageously. When the amount is larger than 50 times the molar amount of the catalyst, heat resistance degrades and a molded product is readily colored disadvantageously.

After the deactivation of the catalyst, the step of removing a low-boiling compound contained in the resin at a pressure of 133 to 13.3 Pa and a temperature of 200 to 320° C. by volatilization may be carried out.

The polycarbonate resin of the present invention can be produced by reacting a dihydroxy component containing 9,9-bis(4-(2-hydroxyethoxy)phenyl)fluorene with a carbonic acid ester component. The purity of 9,9-bis(4-(2-hydroxyethoxy)phenyl)fluorene is 99 wt % or more, and the content of phenoxyethanol is 1 to 500 ppm. The content of fluoren-9-one represented by the following formula (3) in 9,9-bis(4-(2-hydroxyethoxy)phenyl)fluorene is preferably 500 ppm or less.

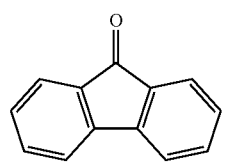

(3)

<Polyester Resin>

Another example of the thermoplastic resin of the present invention is a polyester resin. The polyester resin comprises a unit represented by the following formula (II).

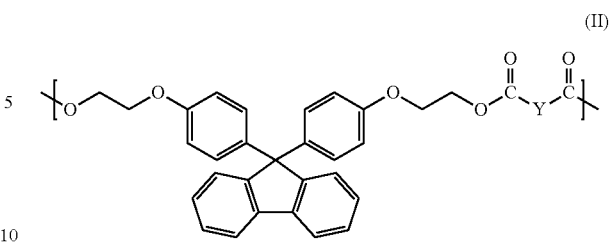

(II)

In the above formula, Y is a unit derived from a dicarboxylic acid component such as phenylene group, naphthalenediyl group or alkylene group.

The polyester resin is a resin obtained by reacting a diol component containing at least BPEF with a dicarboxylic acid component containing a dicarboxylic acid and/or a reactive derivative thereof.

The diol component and the dicarboxylic acid component may be each a single component or may contain two or more compounds.

Examples of another diol compound which can be used in combination with BPEF include linear or branched alkylene glycols having 2 to 12 carbon atoms such as ethylene glycol, propylene glycol, trimethylene glycol, 1,3-butanediol, tetramethylene glycol(1,4-butanediol), hexanediol, neopentyl glycol, octanediol and decanediol, and alicyclic diols such as tricyclo[5.2.1.0(2,6)]decane dimethanol, cyclohexane-1,4-dimethanol, decalin-2,6-dimethanol, norbornane dimethanol, pentacyclopentadecane dimethanol, cyclopentane-1,3-dimethanol, spiroglylcol, isosorbide and isomannide. Also (poly)oxyalkylene glycols such as diethylene glycol, triethylene glycol and dipropylene glycol are also included. These diols may be used alone or in combination of two or more.

The diol used in combination with BPEF is preferably a linear or branched alkylene glycol having 2 to 10 carbon atoms, more preferably a linear or branched alkylene glycol having 2 to 6 carbon atoms, much more preferably a linear or branched alkylene glycol having 2 to 4 carbon atoms such as ethylene glycol, propylene glycol or tetramethylene glycol(1,4-butanediol). The diol component having a particularly preferred function is ethylene glycol.

A diol such as ethylene glycol except for BPEF is useful as a comonomer for enhancing polymerization reactivity and providing flexibility to the resin. Since refractive index, heat resistance and water absorbing property may be deteriorated by the introduction of the comonomer, the copolymerization ratio of the comonomer is preferably low from this point of view.

Examples of the dicarboxylic acid include alkanedicarboxylic acids such as oxalic acid, malonic acid, succinic acid, glutaric acid and adipic acid. Alkenedicarboxylic acids such as maleic acid and fumaric acid, cycloalkanedicarboxylic acids such as cyclohexanedicarboxylic acid, di- and tri-cycloalkanedicarboxylic acids such as decalindicarboxylic acid, norbornanedicarboxylic acid and adamantanedicarboxylic acid, and arenedicarboxylic acids such as terephthalic acid, isophthalic acid, phthalic acid, 2,6-naphthalenedicabroxylic acid, 1,8-naphthalenedicarboxylic acid, anthracenedicarboxylic acid and biphenyldicarboxylic acid (2,2'-biphenyldicarboxylic acid) are also included.

Acid anhydrides such as hexahydrophthalic anhydride and tetrahydrophthalic anhydride are further included. Lower alkyl esters having 1 to 4 carbon atoms such as dimethyl ester and diethyl ester are still further included. Derivatives capable of forming an ester such as acid halide corresponding to a dicarboxylic acid are still further included.

These dicarboxylic acids may be used alone or in combination of two or more. Out of these, cyclohexanedicarboxylic acid and terephthalic acid are preferred because they are inexpensive and industrially easily acquired.

The polyester resin has a content of the unit represented by the formula (II) of 60 mole % or more, preferably 60 to 100 mole %, more preferably 60 to 90 mole % based on the total of all the units. A polyester resin having excellent optical properties such as refractive index is obtained by setting the content of the unit represented by the formula (II) to the above range. As for strength, as the content of BPEF is higher, the elastic modulus becomes higher advantageously. However, since tensile elongation lowers when the content of BPEF is too high, the content of the unit represented by the formula (II) is preferably 90 mole % or less. Therefore, the content of the unit represented by the formula (II) is more preferably 90 to 60 mole %.

The polyester resin has a content of a recurring unit derived from BPEF of 30 mole % or more, preferably 30, to 50 mole %, more preferably 30 to 45 mole % based on the total of all the units. A polyester resin having excellent optical properties such as refractive index is obtained by setting the content of the recurring unit derived from BPEF to the above range. As for strength, as the content of BPEF is higher, the elastic modulus becomes higher advantageously. However, since the polyester resin does not have sufficiently high molecular weight unless the ratio of the diol component to the dicarboxylic acid component containing a dicarboxylic acid and/or a reactive derivative thereof is 50:50, the content of the constituent unit derived from BPEF and represented by the following formula is more preferably 30 to 50 mole %.

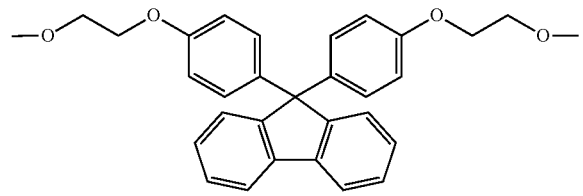

The molecular weight of the polyester resin is preferably 7,000 to 15,000, more preferably 8,000 to 14,000. The molecular weight is measured by the melt viscosity method.

The polyester resin can be obtained by reacting a dicarboxylic acid component (dicarboxylic acid and/or an ester formable dicarboxylic acid derivative) with a diol component containing BPEF in accordance with various methods such as melt polymerization exemplified by transesterification and direct polymerization, solution polymerization and interfacial polymerization. Out of these, a melt polymerization method using no reactive solvent is preferred.

In a transesterification method which is one of melt polymerization methods, a polyester is obtained by reacting a dicarboxylic acid ester with a diol compound in the presence of a catalyst to carry out transesterification while the formed alcohol is distilled off. This transesterification method is generally used for the synthesis of a polyester resin.

As the catalyst for the transesterification reaction, at least one metal compound is desirably used. Examples of the metal element contained in the preferred metal compound include sodium, potassium, calcium, titanium, lithium, magnesium, manganese, zinc, tin and cobalt. Out of these, calcium and manganese compounds are preferred because they have high reactivity and the obtained resin has a good hue. The amount of the transesterification catalyst is $10^{-9}$ to $10^{-3}$ mole based on the formed polyester resin. However, when the amount of the catalyst is larger than the above range, phenyl vinyl ether represented by the formula (1) and acetaldehyde represented by the formula (2) tend to be by-produced, thereby deteriorating the hue disadvantageously.

In the direct polymerization method, a polyester resin is obtained by carrying out a dehydration reaction between a dicarboxylic acid and a diol compound to form an ester compound and then carrying out a transesterification reaction while an excess of the diol compound is distilled off under reduced pressure. This direct polymerization method has such advantages that an alcohol does not distill out unlike the transesterification method and an inexpensive dicarboxylic acid is used as a raw material.

At least one metal compound is desirably used as the polymerization reaction catalyst which is used to carry out these melt polymerization methods. Preferred examples of the metal element include titanium, germanium, antimony and aluminum. Out of these, titanium and germanium compounds are particularly preferred for resins for optical use because they have high reactivity and the obtained resin has high transparency and is excellent in hue. The amount of the polymerization catalyst is $10^{-9}$ to $10^{-3}$ mole based on the formed polyester resin.

To promote the polymerization reaction smoothly so as to produce the polyester resin of the present invention, it is desired that a phosphorus compound should be used in an equal molar amount or more than that of the transesterification catalyst after the end of the transesterification reaction. Examples of the phosphorus compound include phosphoric acid, phosphorous acid, trimethyl phosphate, triethyl phosphate, tributyl phosphate, trimethyl phosphite, triethyl phosphite and tributyl phosphite. Out of these, trimethyl phosphate is particularly preferred. The amount of the phosphorus compound is $10^{-9}$ to $10^{-3}$ mole based on the formed polyester resin.

The transesterification reaction is carried out by feeding a comonomer which is used optionally to a reactor equipped with a heater, a stirrer and a distillation tube, adding a reaction catalyst and elevating the temperature under agitation in an inert gas atmosphere at normal pressure and promoted while a by-product produced by the reaction such as methanol is distilled off. The reaction temperature is 150 to 270° C., preferably 160 to 260° C., and the reaction time is generally 3 to 7 hours.

The polymerization reaction is carried out in a reactor equipped with a heater, a stirrer, a distillation tube and a depressurizing device by using the product obtained after the end of the above transesterification reaction. If these conditions are satisfied, the same reactor as that used for the above transesterification reaction may be used to carry out the polymerization reaction after that.

The polymerization reaction is carried out, for example, by adding a catalyst to a reactor containing the product after the end of the above transesterification reaction, elevating the inside temperature of the reactor and reducing the inside pressure gradually concurrently. The inside pressure of the reactor is reduced from normal pressure to 0.4 kPa or less, preferably 0.2 kPa or less in the end. The inside temperature of the reactor is raised from 220~230° C. up to 250~350° C., preferably 260~320° C. in the end. After a predetermined torque is reached, the reaction product is extruded from the bottom of the reactor and collected. In an ordinary case, the reaction product is extruded into a strand form in water, cooled and cut to obtain a polyester resin pellet. However, when the polymerization reaction temperature is 320° C. or higher, the compounds represented by the formulas (1) and (2) tend to be by-produced disadvantageously.

After the end of the polymerization reaction, the step of removing a low-boiling compound contained in the resin at a pressure of 133 to 13.3 Pa and a temperature of 200 to 320° C. by volatilization may be carried out.

The present invention is a process for producing a polyester resin by reacting a dihydroxy component containing 9,9-bis (4-(2-hydroxyethoxy)phenyl)fluorene with a dicarboxylic acid component, wherein the purity of 9,9-bis(4-(2-hydroxyethoxy)phenyl)fluorene is 99 wt % or more, and the content of phenoxyethanol is 1 to 500 ppm.

The content of fluoren-9-one represented by the following formula (3) in 9,9-bis(4-(2-hydroxyethoxy)phenyl)fluorene is preferably 500 ppm or less.

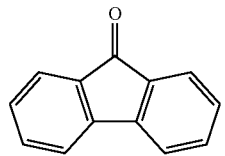

(3)

<Polyester Carbonate Resin>

A further example of the thermoplastic resin of the present invention is a polyester carbonate resin. The polyester carbonate resin comprises units represented by the following formulas (I) and (II). In the formula (II), Y is a unit derived from a dicarboxylic acid component such as phenylene group, naphthalenediyl group or alkylene group.

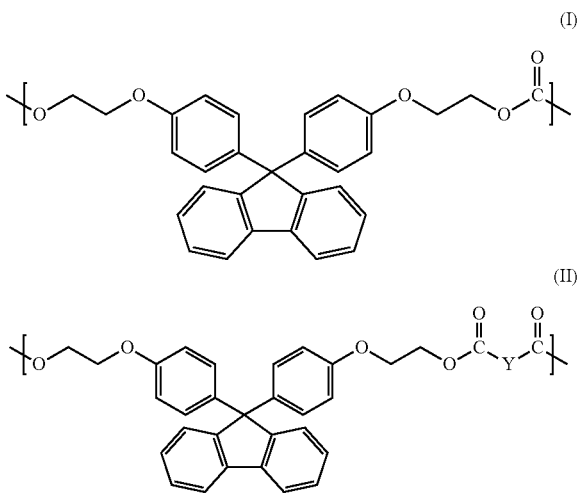

The polyester carbonate resin is a resin which comprises a diol component containing at least BPEF, a dicarboxylci acid, a carbonic acid ester component, and a basic compound catalyst, a transesterification catalyst or a mixed catalyst of these two. The dihydroxy component, the dicarboxylic acid component and the diester carbonate component may each be a single component or may contain two or more compounds.

The diol component which can be used in combination with BPEF is an aliphatic diol such as ethylene glycol. It may be an alicyclic diol such as tricyclo[5.2.1.0(2,6)]decane dimethanol, cyclohexane-1,4-dimethanol, decalin-2,6-dimethanol, norbornane dimethanol, pentacyclopentadecane dimethanol, cyclopentane-1,3-dimethanol or spiroglycol. It may also be an aromatic diol such as 1,1'-biphenyl-4,4'-diol, bis(4-hydroxyphenyl)methane, 1,1-bis(4-hydroxyphenyl)ethane, bis(4-hydroxyphenyl)ether, bis(4-hydroxyphenyl)sulfoxide, bis(4-hydroxyphenyl)sulfide, bis(4-hydroxyphenyl)sulfone, bis(4-hydroxyphenyl)ketone, 2,2-bis(4-hydroxyphenyl)propane, 2,2-bis(4-hydroxy-3-t-butylphenyl)propane, 2,2-bis(4-hydroxy-3-methylphenyl) propane, 1,1-bis(4-hydroxyphenyl)cyclopentane, 1,1-bis(4-hydroxyphenyl)cyclohexane, 2,2-bis(4-hydroxyphenyl) hexafluoropropane, bis(4-hydroxyphenyl)diphenylmethane, 1,1-bis(4-hydroxyphenyl)-1-phenylethane, 9,9-bis(4-hydroxyphenyl)fluorene, 9,9-bis(4-hydroxy-3-methylphenyl) fluorene, α,ω-bis[2(p-hydroxyphenyl)ethyl]polydimethylsiloxane, α,ω-bis[3-(o-hydroxyphenyl)propyl] polydimethylsiloxane, 4,4'-[1,3-phenylenebis(1-methylethylidene)]hydroxyphenyl-1-phenylethane and bisphenol A. They are used alone or in combination of two or more.

Examples of the dicarboxylic acid compound include aliphatic dicarboxylic acids such as terephthalic acid, malonic acid, succinic acid, glutaric acid, adipic acid, pimelic acid, suberic acid, azelaic acid, methylmalonic acid and ethylmalonic acid, and monocyclic aromatic dicarboxylic acids such as isophthalic acid and tert-butylisophthalic acid. Polycyclic aromatic dicarboxylic acids such as naphthalenedicarboxylic acid, anthracenedicarboxylic acid and phenanthrenedicarboxylic acid are also included. Biphenyldicarboxylic acids such as 2,2'-biphenyldicarboxylic acid are further included. Alicyclic dicarboxylic acids such as 1,4-cyclodicarboxylic acid and 2,6-decalindicarboxylic acid are still further included. They may be used alone or in combination of two or more. Out of these, terephthalic acid is preferred. Acid chlorides and esters may be used as derivatives of the above compounds.

Examples of the carbonate precursor used for the production of the polyester carbonate resin of the present invention include phosgene, diphenyl carbonate, and bischloroformates, di-p-tolylcarbonates, phenyl-p-tolylcarbonates, di-p-chlorophenylcarbonates and dinaphthyl carbonates of the above dihydric phenols. Out of these, diphenyl carbonate is preferred.

The total content of the units represented by the formulas (I) and (II) in the polyester carbonate resin is 30 mole % or more, preferably 40 to 100 mole %, more preferably 50 to 90 mole % based on the total of all the units. By setting the total content of the units represented by the formulas (I) and (II) to the above range, a polyester carbonate resin having excellent optical properties such as refractive index is obtained.

The total content of the units represented by the formulas (I) and (II) is more preferably 50 to 90 mole % based on the total of all the units contained in the resin.

The content of the unit represented by the formula (I) in the polyester carbonate resin is preferably 50 to 95 mole %, more preferably 60 to 90 mole %, much more preferably 70 to 90 mole % based on the total of the units represented by the formulas (I) and (II).

The content of a recurring unit derived from BPEF and represented by the following formula in the polyester carbonate resin is 30 mole % or more, preferably 40 to 100 mole %, more preferably 50 to 90 mole % based on the total of all the units. As for strength, as the content of BPEF is higher, the elastic modulus becomes higher advantageously. However, since tensile elongation lowers when the content of BPEF is too high, the content of BPEF is preferably 90 mole % or less.

By setting the content of the unit derived from BPEF and represented by the following formula to the above range, a polyester carbonate resin having excellent optical properties such as refractive index is obtained.

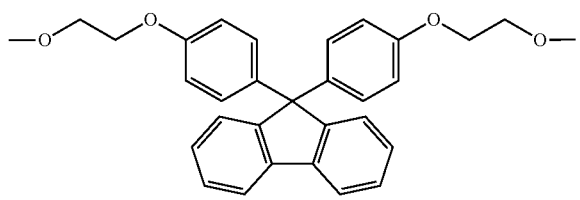

The molecular weight of the polyester carbonate resin is preferably 7,000 to 15,000, more preferably 8,000 to 14,000. The molecular weight is measured by the solution viscosity method.

As the process for producing the polyester carbonate resin, a process which is used to produce an ordinary polyester carbonate resin is optionally employed. For example, a reaction among a diol, a dicarboxylic acid or a dicarboxylic acid chloride and phosgene, or a transesterification reaction among a diol, a dicarboxylic acid and a bisaryl carbonate is preferably adopted.

The reaction among a dial, a dicarboxylic acid or an acid chloride thereof and phosgene is carried out in the presence of an acid binder and a solvent in a non-aqueous system. Examples of the acid binder include pyridine, dimethylaminopyridine and tertiary amines. Examples of the solvent include halogenated hydrocarbons such as methylene chloride and chlorobenzene. An end-sealing agent such as phenol or p-tert-butylphenol is desirably used as a molecular weight control agent. Preferably, the reaction temperature is generally 0 to 40° C., and the reaction time is several minutes to 5 hours.

In the transesterification reaction, a diol, a dicarboxylic acid or a diester thereof and a bisaryl carbonate are mixed together in the presence of an inert gas and reacted with one another under reduced pressure at generally 120 to 350° C., preferably 150 to 300° C. The degree of depressurization is changed stepwise and set to 1 mmHg or less in the end to distill off the formed alcohol to the outside of the system. The reaction time is generally 1 to 4 hours. When the polymerization temperature is 350° C. or higher, phenyl vinyl ether represented by the formula (1) and acetaldehyde represented by the formula (2) tend to be by-produced disadvantageously.

A polymerization catalyst may be used to promote the transesterification reaction. The polymerization catalyst comprises an alkali metal compound, an alkali earth metal compound or a heavy metal compound as the main component and optionally a nitrogen-containing basic compound as an auxiliary component.

Examples of the alkali metal compound include sodium hydroxide, potassium hydroxide, lithium hydroxide, sodium hydrogen carbonate, potassium hydrogen carbonate, lithium hydrogen carbonate, sodium carbonate, potassium carbonate, lithium carbonate, sodium acetate, potassium acetate, lithium acetate, sodium stearate, potassium stearate, lithium stearate, sodium salts, potassium salts and lithium salts of bisphenol A, sodium benzoate, potassium benzoate and lithium benzoate. Examples of the alkali earth metal compound include calcium hydroxide, barium hydroxide, magnesium hydroxide, strontium hydroxide, calcium hydrogen carbonate, barium hydrogen carbonate, magnesium hydrogen carbonate, strontium hydrogen carbonate, calcium carbonate, barium carbonate, magnesium carbonate, strontium carbonate, calcium acetate, barium acetate, magnesium acetate, strontium acetate, calcium stearate, barium stearate, magnesium stearate and strontium stearate.

Examples of the nitrogen-containing basic compound include tetramethylammonium hydroxide, tetraethylammonium hydroxide, tetrabutylammonium hydroxide, trimethylbenzylammonium hydroxide, trimethylamine, triethylamine, dimethylbenzylamine, triphenylamine and dimethylaminopyridine.

The other transesterification catalysts include salts of zinc, tin, zirconium, lead, titanium, germanium, antimony, osmium and aluminum, such as zinc acetate, zinc benzoate, zinc 2-ethylhexanoate, tin chloride (II), tin chloride (IV), tin acetate (II), tin acetate (IV), dibutyltin dilaurate, dibutyltin oxide, dibutyltin dimethoxide, zirconium acetylacetonato, zirconium oxyacetate, zirconium tetrabutoxide, lead acetate (II), lead acetate (IV) and titanium tetrabutoxide (IV).

These catalysts may be used alone or in combination of two or more. The amount of the polymerization catalyst is $10^{-9}$ to $10^{-3}$ mole based on 1 mole of the total of the diol and the dicarboxylic acid. They may be used alone or in combination of two or more. A diaryl carbonate having an electron suction substituent may be added at a later stage or at the end of a polycondensation reaction in order to reduce the amount of a hydroxyl terminal group in the transesterification reaction. Further, an antioxidant or a heat stabilizer may be added to improve the hue.

The catalyst may be removed or deactivated in order to retain the heat stability and hydrolytic stability of the polyester carbonate resin of the present invention after the end of the polymerization reaction. As for the alkali metal compound or the alkali earth metal compound, a method in which the catalyst is deactivated by adding a known acid substance is preferably carried out. Examples of the deactivation substance include esters such as butyl benzoate, aromatic sulfonic acids such as p-toluene sulfonic acid, aromatic sulfonic acid esters such as butyl p-toluenesulfonate and hexyl p-toluenesulfonate, phosphoric acids such as phosphorous acid, phosphoric acid and phosphonic acid, phosphorous acid esters such as triphenyl phosphite, monophenol phosphite, diphenyl phosphite, diethyl phosphite, di-n-propyl phosphite, di-n-butyl phosphite, di-n-hexyl phosphite, dioctyl phosphite and monooctyl phosphite, phosphoric acid esters such as triphenyl phosphate, diphenyl phosphate, monophenyl phosphate, dibutyl phosphate, dioctyl phosphate and monooctyl phosphate, phosphonic acids such as diphenylphosphonic acid, dioctylphosphonic acid and dibutylphosphonic acid, phosphonic acid esters such as diethyl phenylphosphonate, phosphines such as Lriphenylphosphine and bis(diphenylphosphino)ethane, boric acids such as boric acid and phenylboric acid, aromatic sulfonic acid salts such as dodecylbenzenesulfonic acid tetrabutylphosphonium salts, organic halides such as stearic acid chloride, benzoyl chloride and p-toluenesulfonic acid chloride, alkylsulfuric acids such as dimethylsulfuric acid, and organic halides such as benzyl chloride. The deactivator is used in an amount 0.01 to 50 times, preferably 0.3 to 20 times the molar amount of the catalyst. When the amount of the deactivator is smaller than 0.01 time the molar amount of the catalyst, the deactivation effect becomes unsatisfactory disadvantageously. When the amount is larger than 50 times the molar amount of the catalyst, heat resistance degrades and a molded product is readily colored disadvantageously.

After the deactivation of the catalyst, the step of removing a low-boiling compound contained in the resin at a pressure of 133 to 13.3 Pa and a temperature of 200 to 320° C. by volatilization may be carried out.

The present invention includes a process for producing a polyester carbonate resin by reacting a dihydroxy component containing 9,9-bis(4-(2-hydroxyethoxy)phenyl)fluorene with a a dicarboxylic acid component and a carbonic acid ester component, wherein the purity of 9,9-bis(4-(2-hydroxyethoxy)phenyl)fluorene is 99 wt % or more, and the content of phenoxyethanol is 1 to 500 ppm.

The content of fluoren-9-one represented by the following formula (3) in 9,9-bis(4-(2-hydroxyethoxy)phenyl)fluorene is preferably 500 ppm or less.

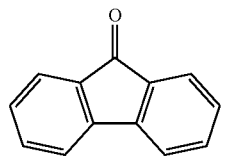

(3)

<b Value of Pellet>

The b value of a pellet obtained after polymerization of the thermoplastic resin of the present invention is −10.0 to 10.0, preferably −7.0 to 7.0, more preferably −5.0 to 5.0. When the b value of the pellet is outside the above range, an optical part having a good hue is not obtained disadvantageously.

EXAMPLES

The following examples are provided to further illustrate the invention but it is to be understood that the invention is not limited thereto without departing from the scope of the invention. The purity of BPEF, the contents of the by-products in the resin and the hue of the pellet used in the examples were measured by the following methods.

(1) Purity of BPEF, the Amounts of Impurities

A mixed solution of eluent methanol and water was used to carry out HPLC analysis in the KROMASIL 5C18 column of Chemco Scientific Co., Ltd. with a gradient program with which the amount of methanol is set to 60% at a time of 0 minute, from 60 to 95% at a time from 0 to 20 minutes, 100% at a time from 20 to 40 minutes and from 100 to 60% at a time from 40 to 47 minutes at a column temperature of 40° C. and a detector wavelength of 254 nm. The measurement was made by dissolving 10 mg of a monomer in 10 ml of a mixed solution of methanol and water (3:2) and then filtering the resulting solution with a PTFE filter having an opening size of 0.2 μm. The amounts of impurities were determined by using a calibration curve.

(2) Quantitative Determination of Sulfur:

The quantity of sulfur was determined by using the SQ-1/HSU-35 automatic combustion halogen/sulfur analyzing system of Yanaco New Science Inc. and the ICS-2000 automatic combustion halogen/sulfur analyzing system of Dionex Corporation.

(3) Contents of Phenyl Vinyl Ether and Acetaldehyde in Resin 1 g of the resin was measured by means of HS-GC/MS heated at 200° C. for 2 hours. A standard phenyl vinyl ether product was prepared by extracting from the resin with acetonitrile and separating from the extract by HPLC. This standard substance was used to form a calibration curve showing peak area ratio and content so as to calculate its content. Also, a standard acetaldehyde product was used to form a calibration curve showing peak area ratio and content so as to calculate its content.

(4) Content of Fluoren-9-One Represented by Formula (3) in Resin 50 mg of the resin was dissolved in 5 ml of chloroform and the resulting solution was analyzed by GPC at a wavelength of 254 nm by using the TSK-GELG2000H and G3000H columns of Tosoh Corporation and the chloroform solvent. Stated more specifically, a sample prepared by adding a predetermined amount of fluoren-9-one was measured by GPC to create a correlation equation between peak area ratio and content so as to determine the amount of fluoren-9-one by using this equation as a calibration curve.

(5) Quantitative Determination of Diethylene Glycol in Resin 50 ml of 1-propanol was fed to a 200 ml stoppered flask, 2.81 g of potassium hydroxide and 2 g of the resin weighed were fed to the flask, a ball cooling tube cooled with water was installed in the flask, and the resulting solution was heated and refluxed under agitation for 2 hours. After cooling, 10 ml of water was added, 7 g of terephthalic acid was added, and the resulting solution was heated and refluxed for 1 hour. 5 ml of a 1-propanol solution containing 1% of tetraethylene glycol dimethyl ether was added as an internal standard and stirred for about 5 minutes. The quantitative determination of the filtered sample was carried out by gas chromatography to obtain the content of diethylene glycol.

(6) b Value of Pellet

The resin pellet obtained after the end of polymerization was put into a glass cell to measure the b value of the pellet by using the SE-2000 color difference meter of Nippon Denshoku Industries Co., Ltd.

Reference Example 1

350 parts by weight (1.94 moles) of fluorenone having a purity of 99.5 wt % and 1,070 parts by weight (7.78 moles) of phenoxyethanol were fed to a glass reactor equipped with a stirrer, a cooling tube and a burette, 2.3 parts by weight of β-mercaptopropionic acid was added and stirred, and 570 parts by weight of 98 wt % sulfuric acid was added dropwise to the resulting mixed solution over 60 minutes while the reaction temperature was maintained at 50° C. After the end of addition, the reaction solution was further stirred for another 5 hours while the reaction temperature was maintained at 50° C. to complete a reaction.

When 2.5 kg of methanol was added to the reaction solution and the mixture was cooled to 10° C. after the end of the reaction, a mixed crystal of BPEF and sodium sulfate was precipitated. After the mixed crystal was extracted by filtration, 3.5 kg of toluene and 1.0 kg of water were added and heated at 85° C. to dissolve sodium sulfate. After a water phase was removed, an organic phase was further washed with 85° C. water twice. Thereafter, a toluene phase was re-precipitated in methanol whose amount was 100 times the amount of toluene so as to collect a crude crystal by filtration. This crude crystal was dissolved in 4.0 kg of toluene at 85° C. to carry out purification likewise. After this operation was repeated twice, the 85° C. toluene phase was cooled to 10° C. to carry out crystallization, and the formed crystal was collected by filtration. Thereafter, the crystal was completely dissolved in acetone, and activated carbon (NoritSX Plus) was added and stirred. Then, the activated carbon was filtered out, acetone was distilled off, and 650 parts by weight of 9,9-(4-(2-hydroxyethoxy)phenyl)fluorene (BPEF (No. 1)) was obtained.

Reference Example 2

350 parts by weight (1.94 moles) of fluorenone having a purity of 99.5 wt % and 1,070 parts by weight (7.78 moles) of phenoxyethanol were fed to a glass reactor equipped with a stirrer, a cooling tube and a burette, and 2.3 parts by weight of β-mercaptopropionic acid was added so as to obtain 700 parts by weight of BPEF (No. 2) in the same manner as in Reference Example 1 except that re-precipitation and recrystallization in methanol were carried out once.

Reference Example 3

350 parts by weight (1.94 moles) of fluorenone having a purity of 98.0 wt % and 1,070 parts by weight (7.78 moles) of phenoxyethanol were fed to a glass reactor equipped with a stirrer, a cooling tube and a burette, and 2.3 parts by weight of β-mercaptopropionic acid was added to obtain 720 parts by weight of BPEF (No. 3) in the same manner as in Reference Example 1 except that re-precipitation and recrystallization in methanol and purification using activated carbon were not carried out.

Reference Example 4

350 parts by weight (1.94 moles) of fluorenone having a purity of 99.5 wt % and 1,070 parts by weight (7.78 moles) of phenoxyethanol were fed to a glass reactor equipped with a stirrer, a cooling tube and a burette, 2.3 parts by weight of β-mercaptopropionic acid was added and stirred, and 570 parts by weight of 98 wt % sulfuric acid was added dropwise to the resulting mixed solution over 60 minutes while the reaction temperature was maintained at 50° C. After the end of addition, the reaction solution was further stirred for another 5 hours while the reaction temperature was maintained at 50° C. to complete a reaction.

When 2.5 kg of methanol was added to the reaction product and the resulting mixture was cooled to 10° C. after the end of the reaction, a mixed crystal of BPEF and sodium sulfate was precipitated. The mixed crystal was extracted by filtration and heated to be dissolved in 3,000 ml of n-hexane, and 3 parts by weight of an alkali was added to the resulting solution and stirred under heating. After the reaction solution was washed with water until it became neutral, the exterior of the reactor was cooled while the reaction solution was stirred at room temperature to precipitate a solid, and the obtained solid was separated by filtration, dried and collected. 690 parts by weight of BPEF (No. 4) was obtained.

The physical properties of the obtained BPEF Nos. 1 to 4 are shown in Table 1.

TABLE 1

| | BPEF No. | Purity of BPEF (wt %) | Contents of by-products (ppm) | | |
|---|---|---|---|---|---|
| | | | Phenoxy-ethanol | fluoren-9-one | Compound S |
| R. Ex. 1 | No. 1 | 99.4 | 185 | 190 | 50 |
| R. Ex. 2 | No. 2 | 99.3 | 450 | 480 | 80 |
| R. Ex. 3 | No. 3 | 98.3 | 1250 | 1450 | 200 |
| R. Ex. 4 | No. 4 | 98.7 | 870 | 980 | 60 |

R. Ex.: Reference Example

Example 1

Polycarbonate Resin 140.32 parts by weight of BPEF (No. 1), 18.27 parts by weight of 2,2-bis(4-hydroxyphenyl)propane (may be referred to as "Bis-A" hereinafter), 87.80 parts by weight of diphenyl carbonate (to be abbreviated as "DPC" hereinafter) and $5.0 \times 10^{-4}$ part by weight of sodium hydrogen carbonate in Table 1 were fed to a reactor equipped with a stirrer and a distillation device, nitrogen substitution was carried out 3 times, and the resulting mixture was heated to 215° C. and 101 kPa in a nitrogen atmosphere and stirred for 20 minutes. After the mixture was completely molten, the inside pressure was adjusted to 20 kPa over 15 minutes, and the mixture was maintained at 215° C. and 20 kPa for 20 minutes to carry out a transesterification reaction. The reaction product was heated up to 240° C. at a temperature elevation rate of 37.5° C./hr and maintained at 240° C. and 16 kPa for 10 minutes. Thereafter, the inside pressure was adjusted to 13 kPa over 10 minutes to maintain the reaction product at 240° C. and 13 kPa for 70 minutes. The inside pressure was then adjusted to 1.3 kPa over 10 minutes to maintain the reaction product at 240° C. and 1.3 kPa for 10 minutes. Further, the inside pressure was adjusted to 130 Pa or less over 40 minutes to carry out a polymerization reaction at 240° C. and 130 Pa or less under agitation for 1 hour. After the end of the reaction, nitrogen was blown into the reactor to increase the pressure so that the formed resin was extracted while it was pelletized. The pellet was colorless and transparent.

Example 2

Polyester Resin 119.81 parts by weight of BPEF (No. 1), 78.03 parts by weight of dimethyl terephthalate (may be abbreviated as "DMT" hereinafter), 15.96 parts by weight of ethylene glycol (may be abbreviated as "EG" hereinafter) and $1.37 \times 10^{-4}$ part by weight of titanium tetrabutoxide in Table 1 were fed to a reactor equipped with a stirrer and a distillation device, nitrogen substitution was carried out 3 times, and the resulting mixture was heated at 220° C. and 101 kPa in a nitrogen atmosphere and stirred for 20 minutes. After the mixture was completely molten, methanol was removed at 220° C. After distillation almost ended, 11.4 µl of trimethyl phosphate and 1.23 ml of a 0.5% germanium oxide aqueous solution were added and heated up to 280° C. over 60 minutes and the vacuum degree was raised over 150 minutes at the same time to carry out a polymerization reaction at 13.3 Pa or less under agitation for 3 hours. After the end of the reaction, nitrogen was blown into the reactor to increase the pressure, and the formed resin was extracted while it was pelletized. The pellet was colorless and transparent.

Example 3

Polyester Carbonate Resin 140.32 parts by weight of BPEF (No. 1), 15.54 parts by weight of DMT, 54.84 parts by weight of DPC and $13.6 \times 10^{-3}$ part by weight of titanium tetrabutoxide in Table 1 were fed to a reactor equipped with a stirrer and a distillation device, and the resulting mixture was heated to 180° C. in a nitrogen atmosphere and stirred for 20 minutes. Thereafter, the pressure was reduced to 20 kPa over 20 minutes to carry out a transesterification reaction by heating up to 250° C. at a temperature elevation rate of 60° C./hr. Then, the pressure was reduced to 130 Pa or less over 120 minutes while the temperature was maintained at 250° C. to carry out a polymerization reaction at 250° C. and 130 Pa or less under agitation for 1 hour. Thereafter, the formed resin was extracted while it was pelletized. The pellet was colorless and transparent.

Example 4

Polyester Carbonate Resin

A resin was synthesized in the same manner as in Example 3 except that 140.32 parts by weight of BPEF (No. 2), 15.54 parts by weight of DMT, 54.84 parts by weight of DPC and $13.6\times10^{-3}$ part by weight of titanium tetrabutoxide in Table 1 were used. The pellet was colorless and transparent.

Comparative Example 1

Polyester Carbonate Resin 140.00 parts by weight of BPEF (No. 3), 15.54 parts by weight of DMT, 54.84 parts by weight of DPC and $13.6\times10^{-3}$ part by weight of titanium tetrabutoxide in Table 1 were fed to a reactor equipped with a stirrer and a distillation device, heated to 180° C. in a nitrogen atmosphere and stirred for 20 minutes. Thereafter, the inside pressure was reduced to 20 kPa over 20 minutes and the inside temperature was raised up to 250° C. at a rate of 60° C./hr to carry out a transesterification reaction. Then, the inside pressure was further reduced to 130 Pa or less over 120 minutes while the temperature was maintained at 250° C. to carry out a polymerization reaction at 250° C. and 130 Pa or less under agitation for 1 hour.

Thereafter, the formed resin was extracted while it was pelletized. The pellet was colored brown.

Comparative Example 2

Polyester Carbonate Resin

A resin was synthesized in the same manner as in Comparative Example 1 except that 140.00 parts by weight of BPEF (No. 4), 15.54 parts by weight of DMT, 54.84 parts by weight of DPC and $13.6\times10^{-3}$ part by weight of titanium tetrabutoxide in Table 1 were used. The obtained pellet was colored brownish yellow.

Comparative Example 3

Polyester Resin 119.81 parts by weight of BPEF (No. 4), 78.03 parts by weight of DMT, 15.96 parts by weight of EG and $1.37\times10^{-4}$ part by weight of titanium tetrabutoxide in Table 1 were fed to a reactor equipped with a stirrer and a distillation device, nitrogen substitution was carried out 3 times, and the resulting mixture was heated to 220° C. and 101 kPa in a nitrogen atmosphere and stirred for 20 minutes. After the mixture was completely molten, methanol was removed at 220° C. After distillation almost ended, 11.4 µl of trimethyl phosphate and 1.23 ml of a 0.5 wt % germanium oxide aqueous solution were added, the temperature was raised up to 280° C. over 60 minutes and the degree of vacuum was increased to 130 Pa or less over 150 minutes at the same time to carry out a polymerization reaction under agitation for 3 hours. After the end of the reaction, nitrogen was blown into the reactor to increase the pressure so that the formed resin was extracted while it was pelletized. The pellet was colored brownish yellow.

Comparative Example 4

Polyester Carbonate Resin

A resin was synthesized in the same manner as in Comparative Example 1 except that 140.00 parts by weight of BPEF (No. 2), 15.54 parts by weight of DMT, 54.84 parts by weight of DPC and $13.6\times10^{-3}$ part by weight of titanium tetrabutoxide in Table 1 were used and the final polymerization temperature was set to 360° C. The pellet was colored brownish yellow.

The physical properties of the obtained thermoplastic resins are shown in Table 2.

TABLE 2

| | | Composition (mol %) | | | | Polymerization temperature (° C.) | b value of pellet | Compound (1) (ppm) | Compound (2) (ppm) | Compound (3) (ppm) | Diethylene glycol (mol %) |
|---|---|---|---|---|---|---|---|---|---|---|---|
| | BPEF | BPEF | Bis-A | DMT | EG | | | | | | |
| Ex.1 | No. 1 | 80 | 20 | — | — | 240 | 3.2 | 14 | 50 | 30 | — |
| Ex.2 | No. 1 | 34 | — | 50 | 16 | 280 | 5.2 | 36 | 135 | 25 | 3 |
| Ex.3 | No. 1 | 80 | — | 20 | — | 250 | 4.5 | 25 | 90 | 20 | — |
| Ex.4 | No. 2 | 80 | — | 20 | — | 250 | 6.5 | 45 | 190 | 110 | — |
| C. Ex. 1 | No. 3 | 80 | — | 20 | — | 250 | 14.5 | 180 | 600 | 230 | — |
| C. Ex. 2 | No. 4 | 80 | — | 20 | — | 250 | 12.0 | 120 | 450 | 220 | — |
| C. Ex. 3 | No. 4 | 34 | — | 50 | 16 | 280 | 13.5 | 140 | 560 | 180 | 5 |
| C. Ex. 4 | No. 2 | 80 | — | 20 | — | 360 | 10.5 | 105 | 320 | 80 | — |

Compound (1) phenyl vinyl ether
Compound (2) acetaldehyde
Compound (3) fluoren-9-one BPEF Nos. 1 to 4 in Table 2 are BPEF Nos. 1 to 4 in Table 1 and contain predetermined impurities, respectively.

The resins of Examples 1 to 4 had low contents of the compounds (1), (2) and (3) and a very good hue after polymerization. The hues of the resins of Examples 1 and 3 in which the reaction temperature was low and the polymerization time was short were better and further that of Example 1 in which a heavy metal-based catalyst was not used was much better. In contrast to this, the resins of Comparative Examples 1 and 2 had high contents of the compounds (1), (2) and (3) and deteriorated in hue after polymerization. Although Comparative Example 3 had a low content of diethylene glycol, it had high contents of the compounds (1), (2) and (3) and accordingly deteriorated in hue. Although the total content of impurities in BPEF in use was low in Comparative Example 4, as the polymerization temperature was high, the resin of Comparative Example 4 had high contents of the compounds (1) and (2) and accordingly deteriorated in hue.

EFFECT OF THE INVENTION

The thermoplastic resin of the present invention is rarely colored during melt polymerization, melt extrusion and molding. When the thermoplastic resin of the present invention is used, an optical part having an excellent hue such as an optical lens, prism, optical disk, optical fiber or optical film can be obtained by injection molding.

INDUSTRIAL APPLICABILITY

Since the thermoplastic resin of the present invention is excellent in hue, it can be advantageously used as an optical material for optical lenses such as camera lenses, projector lenses and pick-up lenses, prisms, optical disks, optical fibers and optical films.

The invention claimed is:

1. A process for producing a thermoplastic resin by reacting a dihydroxy component containing 30 mole % or more of 9,9-bis(4-(2-hydroxyethoxyl)phenyl)fluorene with at least one component selected from the group consisting of a dicarboxylic acid component and a carbonic acid ester component,
wherein the 9,9-bis(4-(2-hydroxyethoxyl)phenyl)fluorine is produced by reacting phenoxyethanol and fluoren-9-one,
wherein the thermoplastic resin is selected from the group consisting of polycarbonate resin, polyester resin, and polyester carbonate resin,
wherein the purity of 9,9-bis(4-(2-hydroxyethoxyl)phenyl)fluorene is 99 wt % or more, and the content of phenoxyethanol is 1 to 500 ppm,
wherein thermoplastic resin has a content of phenyl vinyl ether represented by the following formula (1) of 100 ppm or less, and

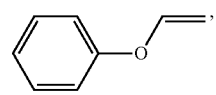

(1)

and
wherein thermoplastic resin has a content of acetaldehyde represented by the following formula (2) of 200 ppm or less,

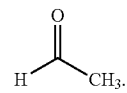

(2)

2. The production process according to claim 1,
wherein the content of fluoren-9-one represented by the following formula (3) in 9,9-bis(4-(2-hydroxyethoxyl)phenyl)fluorene is 500 ppm or less

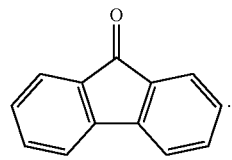

(3)

* * * * *